United States Patent [19]
Fleytman

[11] Patent Number: 5,992,259
[45] Date of Patent: *Nov. 30, 1999

[54] WORM/WORMGEAR TRANSMISSION AND APPARATUS FOR TRANSMITTING ROTATION UTILIZING AN OSCILLATING INPUT

[76] Inventor: Yakov Fleytman, 2875 Troy Center Dr. Apt. 3028, Troy, Mich. 48084

[*] Notice: This patent issued on a continued prosecution application filed under 37 CFR 1.53(d), and is subject to the twenty year patent term provisions of 35 U.S.C. 154(a)(2).

[21] Appl. No.: 08/732,150

[22] Filed: Oct. 16, 1996

[51] Int. Cl.$^6$ ...................................................... F16H 1/16
[52] U.S. Cl. ............................................. 74/425; 74/89.14
[58] Field of Search .................................. 74/425, 89.14

[56] References Cited

U.S. PATENT DOCUMENTS

| | | |
|---|---|---|
| 4,020,715 | 5/1977 | Sollars . |
| 4,987,791 | 1/1991 | Nakahashi . |
| 5,136,888 | 8/1992 | Nix . |
| 5,333,517 | 8/1994 | Bryson et al. . |
| 5,712,552 | 1/1998 | Hirai et al. ............................ 318/568.1 |

FOREIGN PATENT DOCUMENTS

| | | |
|---|---|---|
| 1399721 | 5/1988 | U.S.S.R. . |
| 1437212 | 11/1988 | U.S.S.R. . |
| 1442983 | 12/1988 | U.S.S.R. . |
| 1495110 | 7/1989 | U.S.S.R. . |
| 1665358 | 7/1991 | U.S.S.R. . |

OTHER PUBLICATIONS

Gear Handbook—The Design, Manufacture, and Application of Gears; Darle W. Dudley; © 1962; pp. 3–1–3–5 and 4–42–4–45.
*Software Strategies* Magazine, dated Mar. 1996, p. 51.
F.C. Williams and D. Tipping: A mechanical torque converter, and its use as an automobile transmission, Proc. Inst. Mech. Ingrs. 1976. V. 190. No. 32. pp. 447–456.
Design of Industrial Double–Enveloping Wormgears (ANSI/AGMA–6030–C87).

*Primary Examiner*—Tamara L. Graysay
*Assistant Examiner*—David Fenstermacher
*Attorney, Agent, or Firm*—Harness, Dickey & Pierce, P.L.C.; Ryan W. Massey

[57] ABSTRACT

A new type of worm/wormgear transmission with number of wormgear teeth 11 and less described. The worm gear is a split-worm gear. The ratio of worm gear teeth to worm thread less than 11. A unique transmission utilizes a self-locking worm and worm gear combination. The worm (3) is journaled in a rotor (8) such that upon rotation of the worm about an axis of the worm gear (1), the rotor is also rotated. The worm is preferably driven by an auxiliary motor (3) about its own axis under certain conditions. An input to the worm gear (1) is transmitted without relative movement to the thread of the worm to cause the thread and hence the rotor to rotate about an axis of the worm gear. The auxiliary motor preferably rotates the worm thread relative to the worm gear teeth under certain conditions when it is not desired to transmit rotation. A system for transmitting an oscillating input (4) to a single directional output (9) incorporates some of the worm and worm gear combinations.

5 Claims, 16 Drawing Sheets

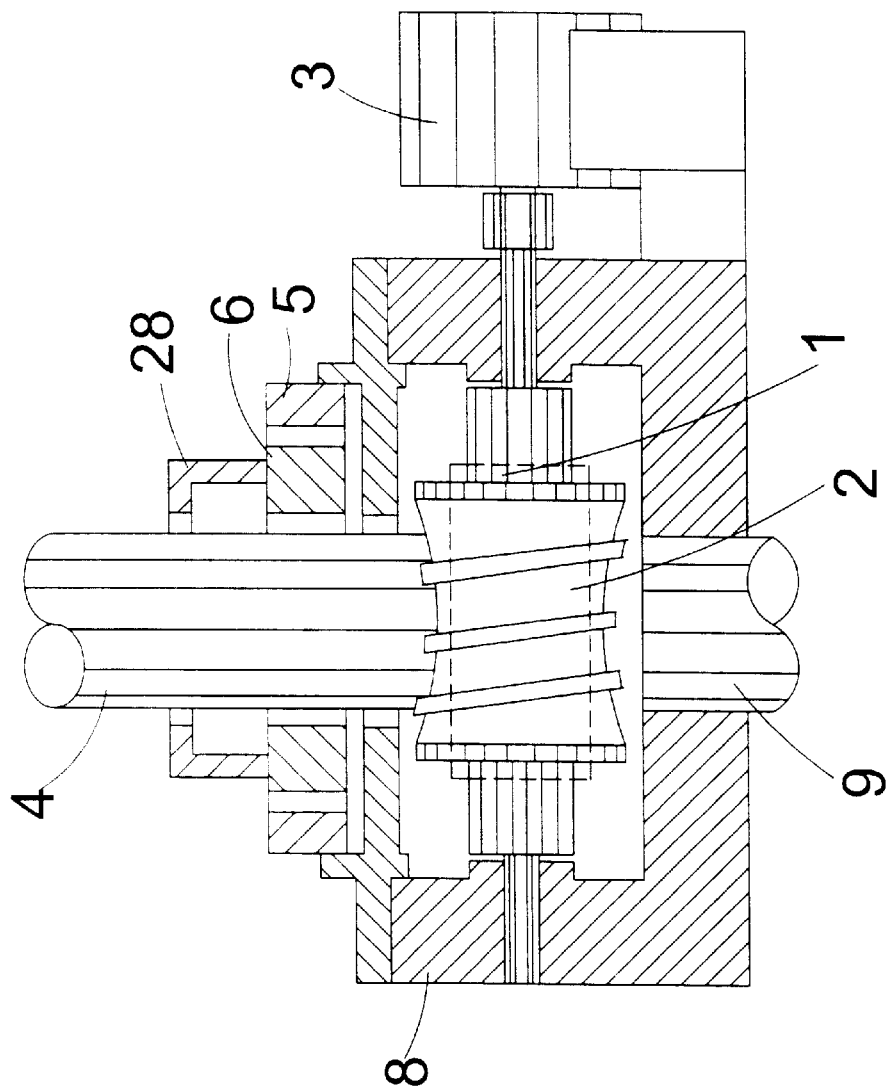

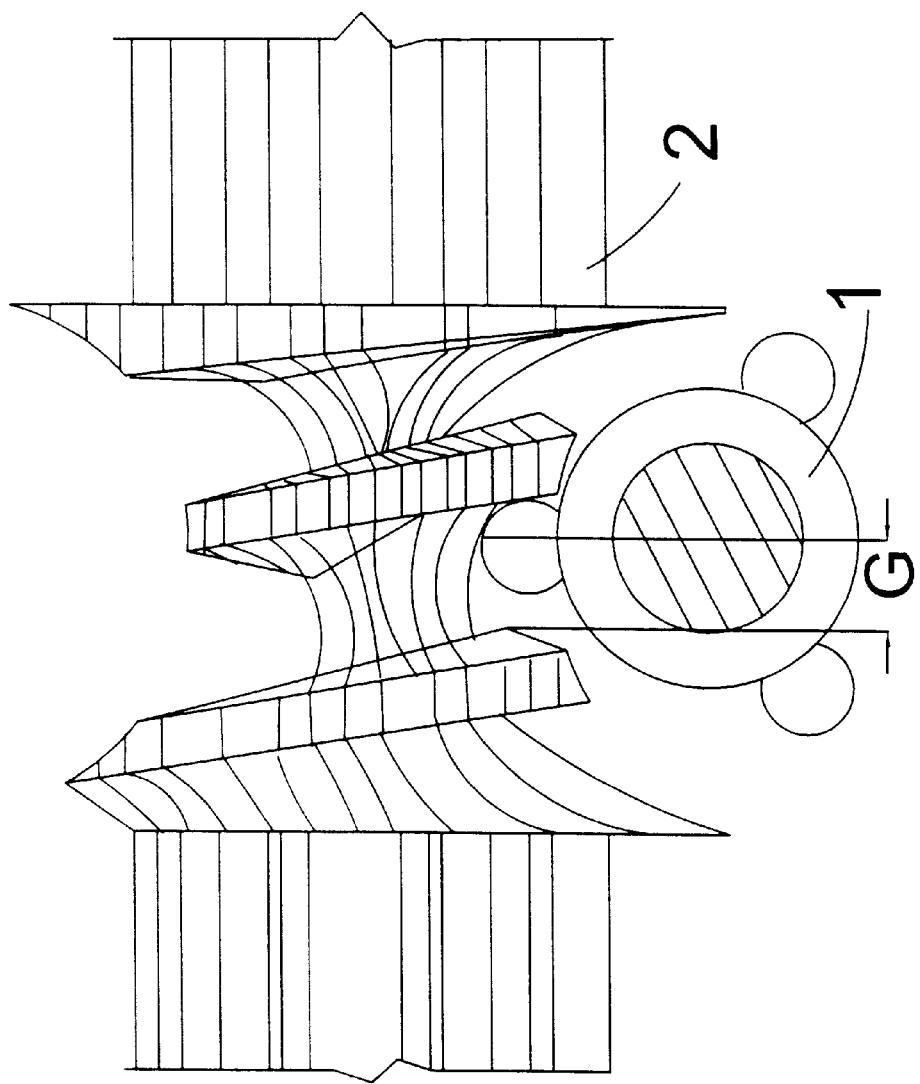

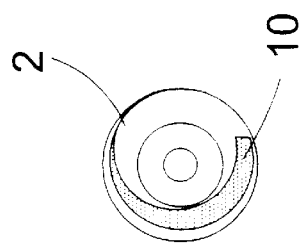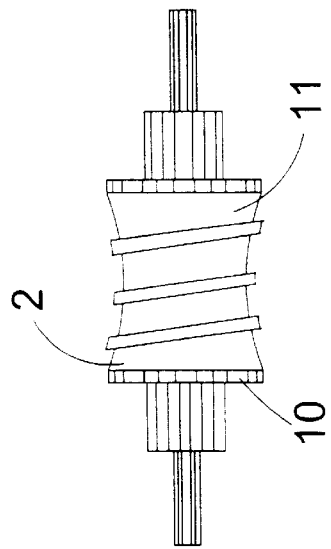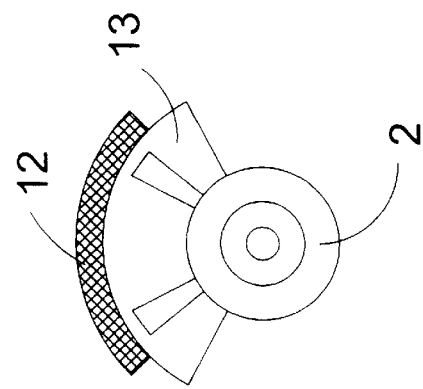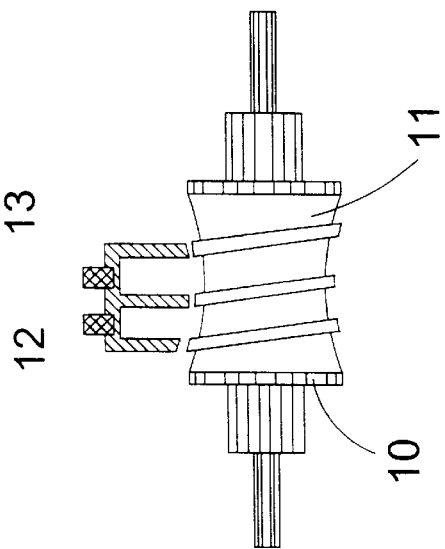

WORM/WORMGEAR TRANSMISSION AND APPARATUS FOR TRANSMITTING ROTATION UTILIZING AN OSCILLATING INPUT

BACKGROUND OF THE INVENTION

This invention relates to speed reducers, in particularly those with very low ratio and unique transmission which is able to transmit higher torque levels than prior art transmissions. Moreover, this invention extends to a combined transmission system that transmits an oscillating input into a single direction output.

Transmissions are utilized to transmit rotation for a variety of purposes. The term "transmission" as utilized in this application, does not specifically refer to a vehicle transmission, although it would extend to such transmissions. Rather, this invention extends to any system wherein a source of movement is transmitted through a driving member to move a driven member.

Worm/worm gear transmissions, in particular, speed reducers, are well known in the mechanical power transmission field. The gear is driven by the rotation of the worm with which it meshes. The rotational speeds of the associated shaft of the gear are a function of the number of teeth on the gear and the number of threads on the worm. The worm may be single or multiple threaded. The prior art worm/worm gear transmission had 12 or more teeth. Even American National Standard "Design of Industrial Double-Enveloping Wormgears" (ANSI/AGMA -6030-C87) recommend 24 as minimum number of gear teeth. Furthermore, enveloping angle of any well known worm is not more than 30°.

The prior art transmissions have not successfully transmitted high torque levels. One common type of transmission is a one-way clutch. In these known systems (U.S. Pat. No. 5,333,517 by Rodney Bryson, Aug. 2, 1994) rollers, or other drive members are engaged within notches or openings in a driven member. The rollers engage and move the driven member when rotation is transmitted in the first direction, but will slip when rotation is transmitted in the second direction. This invention has ratio of 5 between worm and worm gear, but the number of threads on the worm is more than one, and this worm does not have self-lock feature. These types of clutches have enjoyed wide usage, but have been unable to transmit high torque loads. One proposal suggests using a pair of such clutches with an oscillating input to perform as a part of a vehicle transmission. Due to the low torque load, this system would be impractical. Main disadvantage of these types of clutches are discrete character of changing of contact. It leads to mechanical shocks during every new contact between driving and driven elements. Drive system for providing speed in a single rotational direction from a reversible input also well known (U.S. Pat. No. 5,333,517 by Rodney Bryson, Aug. 2, 1994). But this system has a gear train with some backlashes and it is not able to provide a small amplitude of vibration. Besides input and output shafts are perpendicular to each other, and therefore this drive system can not be used in many applications.

In one system disclosed in Soviet inventor certificate number 1,495,110, 1989, granted to the inventor of this invention, a self-locking transmission is utilized to transmit rotation. In the disclosed system, a worm and worm gear combination are utilized to transmit rotation. The rotation is transmitted utilizing the engaged teeth and thread of the gears such that there is no relative movement between the two gear members during this rotation. With such a system, many valuable benefits result. In particular, one is able to accurately and efficiently transmit rotation through the self-locking transmission. Main advantage of these types of clutches is continues contact between driving and driven elements.

In addition, the standard power supply utilized with such systems has difficulty allowing any of the structure to make a free turn of 360 degrees. Instead, electrical supply lines have typically limited the operative members to a restricted range of rotation. This is, of course, undesirable.

The term "self-locking" as it is utilized in this application to describe the inventive worm and worm gear combination, means that the teeth of the worm gear when in contact with the thread of the worm, are capable of rotating the worm about the axis of the worm gear. The teeth do not slip on the thread causing the thread to rotate about its own axis. By carefully selecting the material of the respective teeth and threads, and the respective angles, a worker of ordinary skill in the art would be able to achieve this goal.

However, there are some deficiencies in the system disclosed in the prior inventor's certificate. This invention and the related co-pending application of the same inventor, Ser. No. 08/353,797, and PCT International Application No. PCT/US95/15938, disclose improvements to the prior art system, and PCT International Application No. PCT/US96/02918.

SUMMARY OF THE INVENTION

In one feature of the present invention, a worm and worm gear combination utilized to transmit rotation has the smallest ratio between the number of worm gear teeth and one worm thread. In the past, it has been believed that at least 12 teeth are required for a worm gear to be used with a worm combination. This has been typically required because the standard worm and worm gear combination utilizes the threads and teeth rotation to drive the driven member. However, in the present invention the big difference from the traditional worm/worm gear is not only in the number of teeth, but also in enveloping angle of a worm, which can be 180° when the number of worm gear teeth are only 2.

The inventive system utilizes the engaged teeth and thread of the two gear members to drive the driven member. Typically, the driven member is driven about an axis other than its axis of rotation. As such, the teeth are not performing their ordinary function, but rather are providing abutting surfaces. Moreover, as disclosed in more detail in the above cited co-pending applications, it is often desirable to allow the driving members to return to an initial position after the driving stroke. In such a system, a second motor may be placed for rotating one of the gear members relative to the other to allow a return to the original position without any further transmission of motion. In a worm and worm gear combination having a high tooth to thread ratio, the motor would have to turn the worm at an undesirable high rate of rotation to achieve the return movement. In addition, in a system disclosed in this application, it is sometimes desirable to rotate the worm relative to the worm gear without any interaction between the teeth and threads. Again, if the worm and worm gear combination have a high tooth to thread ratio, the motor would have to turn at an undesirable high rate. In this invention, a self-locking worm/worm gear combination can have a worm gear to worm thread ratio that is preferably 11 or less. In the most preferred embodiment, it is preferably three, or even two.

More preferably, the worm and worm gear combination is incorporated into a system wherein the worm is mounted for rotation in a rotor. The rotor surrounds a driving worm gear. A rotational input is applied to the worm gear. The worm gear teeth engage the thread on the worm, the worm and the rotor rotate about the axis of the worm gear. This rotation is without relative movement between the engaged teeth of the worm and worm gear. The rotor movement is utilized as work.

An auxiliary motor is preferably mounted on the rotor. It rotates the worm relative to the worm gear to either return the worm gear to its original position, or to allow the worm gear to move relative to the worm when an oscillating input is utilized. When subjected to an oscillating input, the worm and rotor act as a mechanical diode, resulting in a single direction output. The motor may include electrical components associated with the rotor, and the worm may include a conductive material such that it can be rotated as a magnet. Alternatively, a separate drive motor may be mounted on the motor and associated with the worm.

In further features, counterbalances may be applied to the worm and to the rotor to insure that the rotation of the tube is smooth. In another feature, a rotating electrical supply may be associated with the input shaft to deliver electrical power to the secondary motors for driving the worm. Due to this, there is no problem connecting the electrical connections to the operative members, even when the operative members freely rotate about 360 degrees.

In further aspects of this invention, two of the worms, and worm gears and rotor combinations are mounted in combination. An oscillating input is applied to the two worm gears. One of the worms is driven by one sign or direction of the oscillating input, while the second of the worms is rotated relative to its worm gear to avoid any rotation during this first direction. The rotor associated with the driven worm is thus driven to rotate above the axis of the worm gear. When the second rotation direction is applied to the input shaft, the first worm, which was originally driven, is now rotated about its axis such that it is no longer driven by the first worm gear. The first worm gear thus rotates relative to the first worm during this rotation direction. At that time, the second worm is driven by the second worm gear. A mechanical connection preferably connects the two worm and worm gear sets such that the rotation of both associated rotors results in a single directional rotation on an output shaft.

With such a system, the above-described features of each worm and worm gear combination become particularly important. An auxiliary motor must drive each worm during one half of the operation to allow the worm gear to rotate relative to the worm without any interaction. For such a result to occur, the worm has to rotate effectively at a rate which is equal to the ratio of the gear teeth and thread of the worm gear and worm. As mentioned above, with this invention a ratio of three or less is preferred. Thus, the worm gear must be driven by the auxiliary motor at a speed which is three times the input speed to the worm gear. In the prior art worm and worm gear systems with a number of teeth on the order of 12, the necessary rotational speed to the worm would be to high to be practical.

In further features of this invention, the system provided by the two worm and worm gear sets described above can be utilized as a part of a vehicle transmission with an oscillating transmission. For example, when this system is utilized, as part of a vehicle transmission with an oscillating transmission, a method of starting a vehicle includes the steps of rotating both of the worms with an auxiliary motor. This reduces the load on the vehicle engine during starting as no torque will be transmitted. Instead, both of the worms will be rolling along the worm gears during both of the oscillating input directions. No rotation will be transmitted to the output shaft until the motor has started up sufficiently such that the torque may be engaged. At that time, the method described above will begin.

In a case of braking a vehicle utilizing such a transmission, when an indication is made that it is desirable to reduce the speed of the vehicle, the input speed to the worm gears is reduced. At the same time, the auxiliary motors driving the worms are also actuated to cause the worms to rotate opposite to the normal driving orientation. Positive torque will not be transmitted to the worms, and thus to the rotors. Instead, the worms are controlled such that they utilize rotation that is opposed to the typical driving direction. Thus, the worms are driven by their respective auxiliary motors, not at positive torque, but rather to add negative torque to the output shaft. This method will assist in the rapid braking of the vehicle speed.

These and other features of the present invention may be best understood from the following specification and drawings, of which the following is a brief description.

BRIEF DESCRIPTION OF THE DRAWINGS

FIG. 3 is a cross-sectional view through the system of FIG. 2 along a different plane.

FIG. 4 is a cross-sectional view of one feature of the present invention.

FIG. 5 shows a worm incorporated into the present invention.

FIG. 6 is an end view of the gear shown in FIG. 5.

FIG. 7 shows a further detail of one embodiment of the inventive system.

FIG. 8 shows an end view of the embodiment shown in FIG. 7.

DETAILED DESCRIPTION OF PREFERRED EMBODIMENTS

Figure 1B:
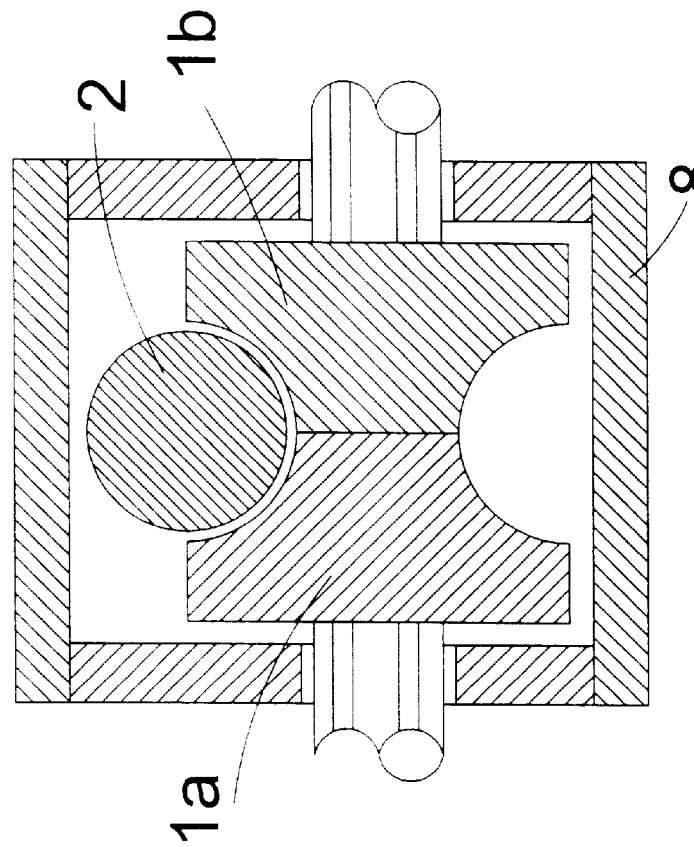
FIG. 1B is a cross-sectional view through the system of FIG. 1A along a different plane.
Figure 1A:
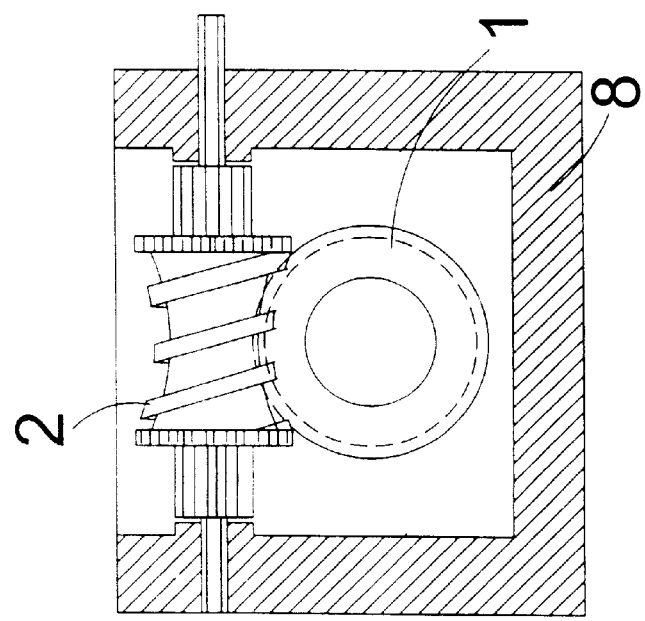
FIG. 1A is a cross-sectional view of a worm/worm gear transmission incorporating the present invention.

A worm/worm gear transmission is shown in FIG. 1A. This worm gear 1 and worm 2 are enclosed in the housing 8. Usually housing is made from metal and forms a reservoir for a lubricant to both lubricate the gears, bearings, and seals to serve as a coolant for the unit. The housing forms a rigid support to mount the gears, bearings, seals and their associated parts (not showed). The worm 2 wraps around the worm gear 1, and enveloping worm gear 1 also wraps around a worm. During rotation of the worm 2 the worm gear 1 rotates with low speed. The minimum ratio between the number of worm gear teeth and one worm thread is 2. Opposite, by rotation of the worm gear 1, worm 2 rotates with higher speed. A worm/worm gear transmission is show in FIG. 1B. Longitudinal split the worm gear into two halves, 1A and 1B is easy to assemble in a single reduction unit. This is very important for gearset with small pressure angle, when difficult to assemble the worm 2 with the worm gear 1. To provide preload in direction around an axle of the gear for this two halves by additional force (for example by spring-not showed) eliminate a backlash between teeth of the worm gear 1 and thread of the worm 2. For many applications only a half body of a split-worm gear, for example only the half worm gear 1A. is enough. The bodies of the split-worm gear 1 have extending and flanges which hook underneath flanges of adjacent collars to hold the worm gear in place. One or both of the worm gear bodies are keyed or otherwise fastened to the shaft for driving or to be driven. Relatively slight longitudinal movement of one or both disassembling the entire worm gear—collar—shaft assembly.

Figure 2:
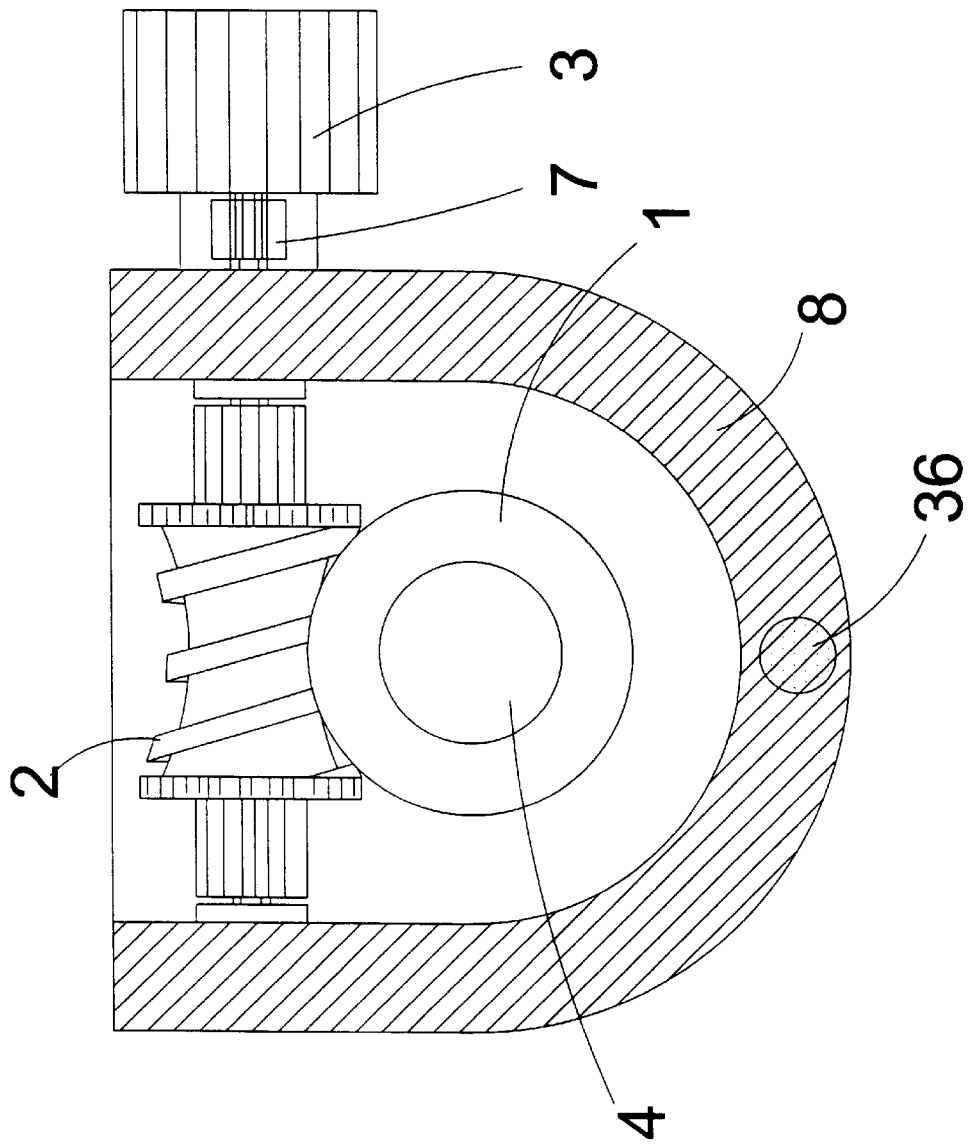
FIG. 2 is a cross-sectional view of a worm and worm gear combination incorporating the present invention.

A worm and worm gear combination is illustrated in FIG. 2. As shown, an enveloping worm gear 2 engages an enveloping worm 1 (enveloping profile of the gear not showed). An auxilliary motor 3 is associated with the worm gear through a clutch 7 to drive the worm under certain conditions. Clutch 7 as shown in this figure may be an electromagnetic clutch which is associated with the transmission between motor 3 and worm 2. As shown, worm 2 is in bearings in housing 8. An output shaft 9 is shown centered on the rotational axis of the worm gear 1, but, as will be shown below, is independent of the worm gear 1. As is further shown, a counterweight 36 may be inserted into the rotor 8 where appropriate. As shown in FIG. 3, an input shaft 4 drives worm gear 1. Output shaft 9 rotates with housing 8. In this case, housing 8 becomes a rotor. A fixed or primary coil 6 is mounted to a fixed housing 28, and associated with a moving coil 5 to transmit electrical energy to the motor 3. The connection is shown schematically. However, the coils are of a known type wherein electrical power is supplied to the fixed coil 6, and transmits electrical power to the moving coil 5. As an alternative to the rotating coil 5 and fixed coil 6, a brush connection could be utilized for the inventive purpose described in this application. During operation of the system shown in this figure, rotor 8 rotates relative to the primary fixed coil 6. Moving coil 5 rotates with the rotor 8. The primary coil 6 can transmit power to the coil 5 at any relative location, and thus there will be no interruption in power between the coil 6 and the motor 3 or the clutch 7.

As shown in FIG. 4, the worm 2 has a single thread in a preferred embodiment. The worm gear 1 has three teeth spaced about the circumference of the worm gear 1. As shown, a gap G exists between any tooth on worm gear 1 and the thread on worm 2. With the gears 1 and 2 in the position shown in FIG. 3, further rotation of the worm gear 1 about its axis causes the worm 2 to rotate about the axis of worm gear 1. Rotor 8 moves along with worm 2 during rotation. In this way, rotation of the output shaft 9 is achieved. This rotation is without relative movement between the gears 1 and 2. That is, the teeth of the worm gear 1 directly engage the thread on the worm 2, and there is no relative movement during this transmission. This rotation is provided by a normal force from the worm gear teeth against the thread on the worm. There is no relative movement, and thus the efficiency is maximized. This rotation is achieved if the teeth and threads are designed to be "self-locking" as described above. A worker of ordinary skill in the art would recognize how to design a self-locking gear set.

Although various combinations of this basis system are within the scope of this invention, one main feature of this invention is utilizing such combinations as a pair and transmitting an oscillating input into a single direction output. For such cases, the input to the worm gear 1 switches between two directions. It is only desirable to have that input rotate the worm 2, and hence rotor 8, during one half of the oscillating input. When it is not desirable to have the worm gear 1 rotating the worm 2, the system rotates worm 2 through motor 3. This rotation is provided such that the thread on the worm 2 avoids any forces from the teeth on worm gear 1, thus avoiding any transmission of rotation to the worm 2, and rotor 8. This benefit will be explained in more detail below. As explained in more detail in the above-referenced co-pending U.S. applications, it is also desirable to have some gap between the teeth on the worm gear 1 and the worm 2. Gap G is taken up prior to any transmission of rotation, and it is desirable that the contact be initially taken up as a low torque load. These features are explained in more detail in the above-referenced co-pending application.

Moreover, since it is desirable to rotate the worm to avoid the worm gear 1 teeth, it is desirable to increase the size of the gap G. For example, worm 2, as shown in FIG. 4, must be rotated by motor 3 at a speed which is three times the input speed to the worm gear 1. This is equal to the ratio of gear teeth on worm gear 1 to the threads on worm 2. As shown in this figure, the ratio is 3 to 1. It is typically assumed that the ratio need to be at least 18 for an effective worm and worm gear combination. Such a ratio would require an auxiliary motor 3 turning the worm 2 to avoid interaction with the teeth on worm gear 1. That would be impractical when the input speed is very high. In the present invention, it is preferred that the ratio of teeth on the worm gear 1 relative to the threads on worm 2 is 11 to 1 or less. Most preferably, the ratio is three or even less, as shown. It is possible that only 2 teeth need to be utilized on the worm gear 1. The teeth could actually be more akin to stops than standard gear teeth. As explained above, the transmission of power from the worm gear 1 to the worm 2 occurs without relative movement as is typically the case with the worm and worm gear combination. Rather, the teeth of the worm gear 1 are brought into contact with the thread on the worm 2, and the worm gear 2 is prevented from rotation about its own axis. A force is applied to the worm gear 1 which drives the worm 2 about the axis of the worm gear 1, thus imparting rotation to the rotor 8.

Since the worm and worm gears are not utilized as in standard gears to have inter-engaging teeth and threads, the material selected for the members is different than that which has been utilized in the past. In the past, the worm and worm gears have been formed of materials having low coefficients of friction, typically lubricant utilized. In this invention, not lubricant would be desirable typically. Moreover, the worm and worm wheel are made from a strong material such as steel. The preferable shape of the teeth and threads and the worm and worm gears is shown in the drawings. Even so, a worker of ordinary skill in the art would recognize that other shapes would come within the scope of this invention.

In addition, a material that actually increases the friction may be placed on the teeth and threads. Again, the goal is to achieve the self-locking property, rather than any smooth movement between the worm and the worm gear. The reduction of the number of teeth on the worm gear also reduce the inertia of the worm gear, thus increasing the speed at which the worm gear can shift between its oscillating inputs. Finally, rather than simply reducing the number of worm gear teeth, the thickness of the worm thread could be reduced to result in an acceptable gap.

As shown in FIG. 5, it may be desirable to include counterweights 10 and 11 at the ends of the worm 2. The counterweights may be formed by cutouts or holes in the worm 2. FIG. 6 shows further details of the counterweight 10 at one end of worm 2.

As shown in FIGS. 7 and 8, as an alternative to the separate motor 3, a stator 12 and a core 13 may be incorporated into the rotor 8. With such a system, the worm 2 is preferably made of a conductive material. By controlling the electrical energy to the part 12 and 13 of a motor, the system can provide rotation of the worm 2 to replace the auxiliary motor 3 as described above. The preferred motor is an asynchronous motor having a relatively low torque.

With either the separate motor 3, or the part of a motor 12 and 13 as shown in FIGS. 7 and 8, the auxiliary motor will be of a relatively low torque. The motor's function is to turn the worm without any interaction relative to the teeth of the worm gear and stop under overload or rotating (when motor has friction clutch) even when a worm is fixed by a worm gear. Thus, a high torque motor need not to be utilized. For that reason, only a low power load is required to operate the auxiliary motor.

Figure 9:
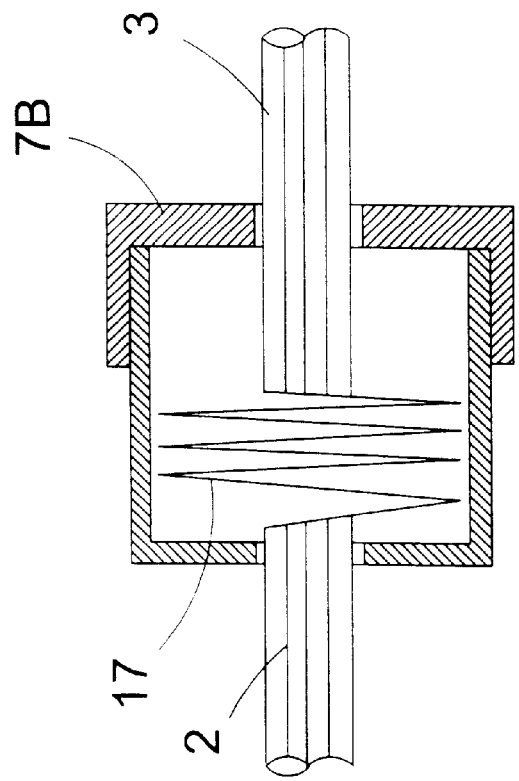
FIG. 9 shows one embodiment of a clutch incorporated into the present invention.
Figure 10:
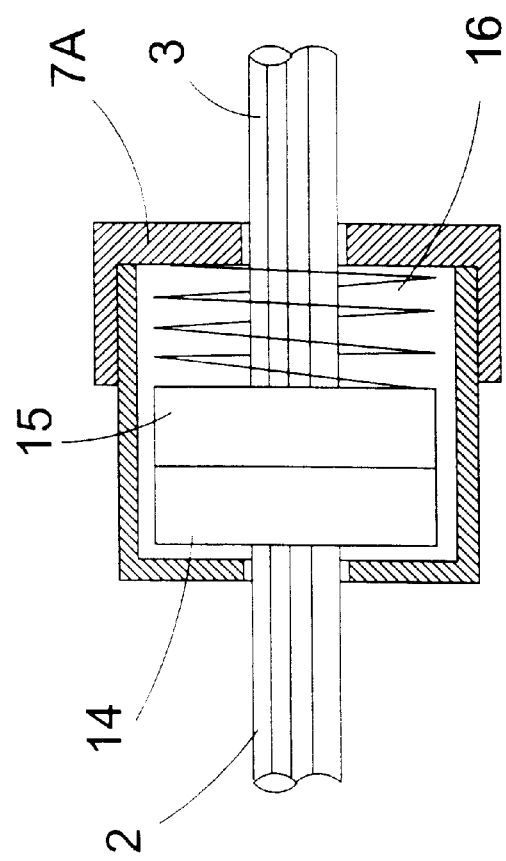
FIG. 10 shows an alternative clutch.

FIGS. 9 and 10 show alternative clutches to replace the electromagnetic clutch 7 as shown in FIGS. 1 and 2. In one clutch 7a shown in FIG. 9, a pair of friction disks 14 and 15 are held into contact by a spring 16. As shown in FIG. 10, a clutch 7b can incorporate a strong spring 17 connecting a motor shaft 3 to the worm 2. With either clutch, should the resistance to rotation on the worm 2 exceed the force of the springs, the members will be allowed to slip relative to each other.

Figure 11:
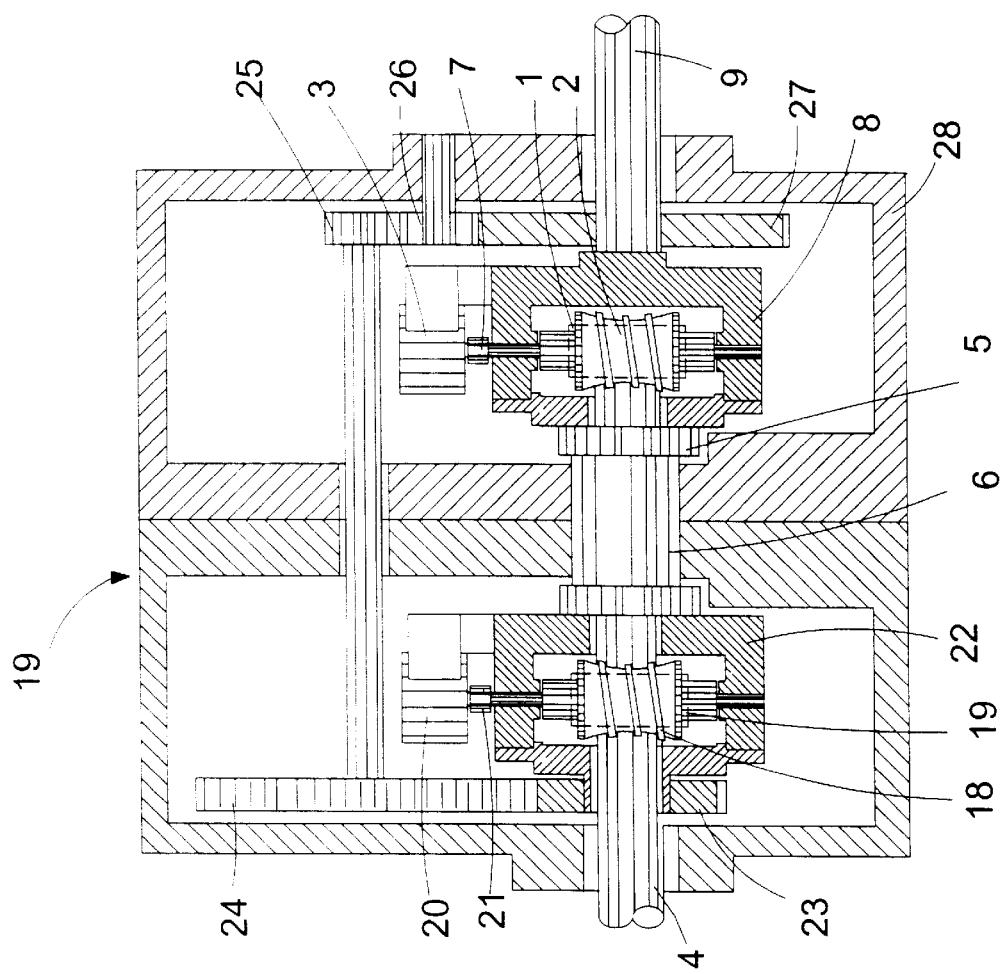
FIG. 11 shows a first embodiment for transmitting an oscillating input onto a single directional rotation.

FIG. 11 shows a transmission 19 which may be utilized to take an oscillating input on shaft 4 and transmit the oscillating input into a single directional rotation on output shaft 9. Such a system is desirable so that each one of the worm and worm gear combinations described above can transmit very high torque loads when compared to prior art transmissions.

Thus, in a typical vehicle application, the normal output of the engine is passed through a mechanical transformer that would transform the single directional output into an oscillating output. The transformers may be of known construction. The oscillating output is then communicated to the input shaft 4. As shown in FIG. 11, the worm and worm gear combination 18 and 19. A second auxiliary motor 20 and clutch 21 are also included as is a second rotor 22. Electrical connections 6 and 5 are associated with both the worm and worm gear sets. As described above the worm and worm gear subset 1 and 2 is driven by the input shaft 4 during one half of the oscillating cycle on the input shaft 4. As shown, a gear 23 rotates with a rotor 22 and engages another idler gear 24. Gear 24 drives an idler gear 25 which in turn drives an idler gear 26. Idler gear 26 drives a gear 27 which is associated with the output shaft 9.

Now, the operation will be described during one cycle of an oscillating input when applied to the input shaft 4. During the first direction of movement, the worm gear 1 drives the worm 2, which in turn drive its rotor 8 and applies a rotation to output shaft 9. At that time, the auxiliary motor 20 rotates worm 18 such that its thread avoids the teeth on the worm gear 19. Again, the ratio of the worm gear teeth to the threads on the worm is preferably selected to be low such that the auxiliary motor 20 need not rotate at a very high rate of speed. Once that direction of oscillating input has ended, and the other direction begins, motor 20 stops or still rotates, but clutch 21 slips. Rotation is next transmitted from the worm gear 19 to the worm 18. At the same time, the auxiliary motor 3 is actuated to roll the teeth of worm 2 relative to the teeth on worm gear 1, avoiding any interaction. The rotation of the worm 19 causes corresponding rotation of rotor 22, and rotation through gear 23 to gear 24 and gear 25. Gear 25 in turn drives idler gear 26, which drives gear 27, thus applying rotation to shaft 9. In this way, the oscillating input 2 to input shaft 4 is transmitted into a single directional rotational torque on output shaft 9. Both worm and worm gear combinations individually transmit a high torque. The overall system 19 is thus able to transmit a very high torque load.

Figure 12:
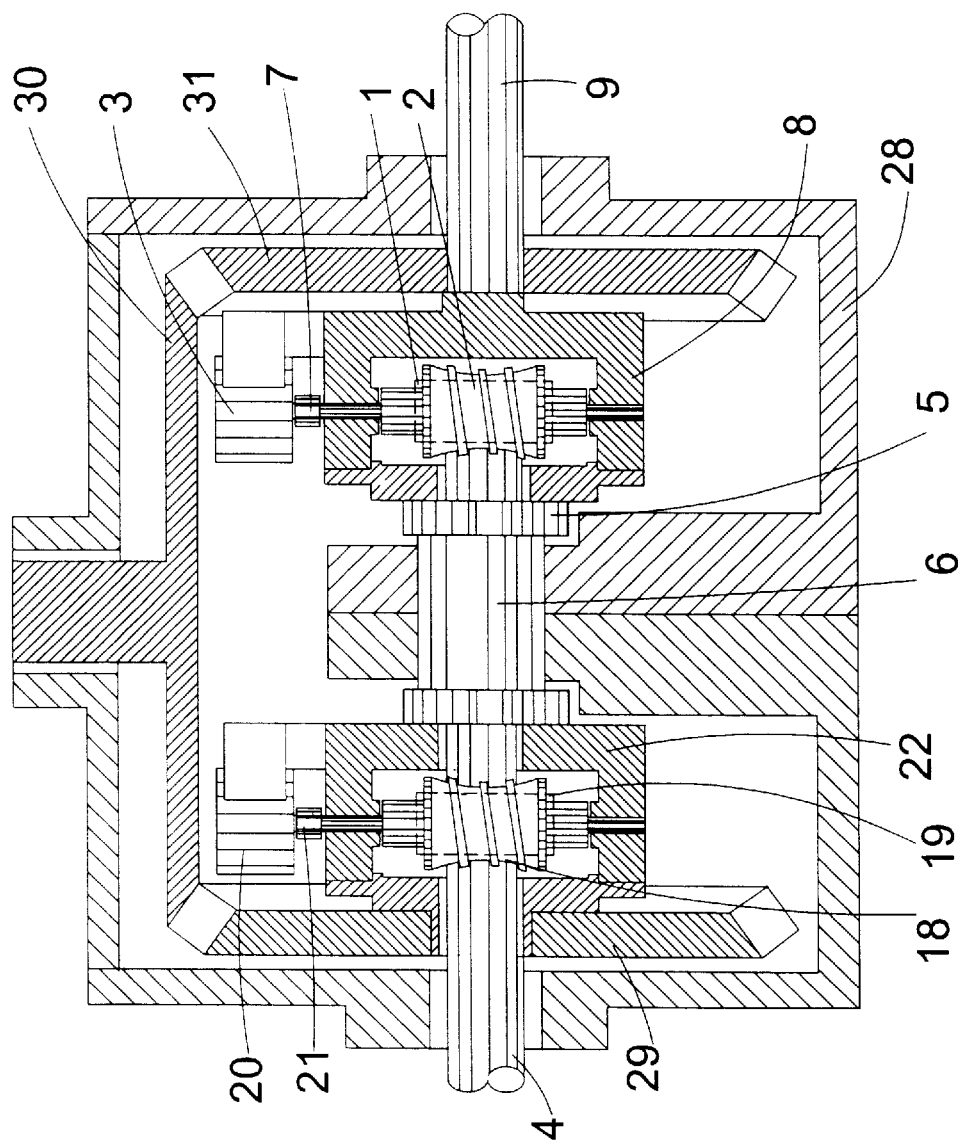
FIG. 12 shows a second embodiment transmission.
Figure 13:
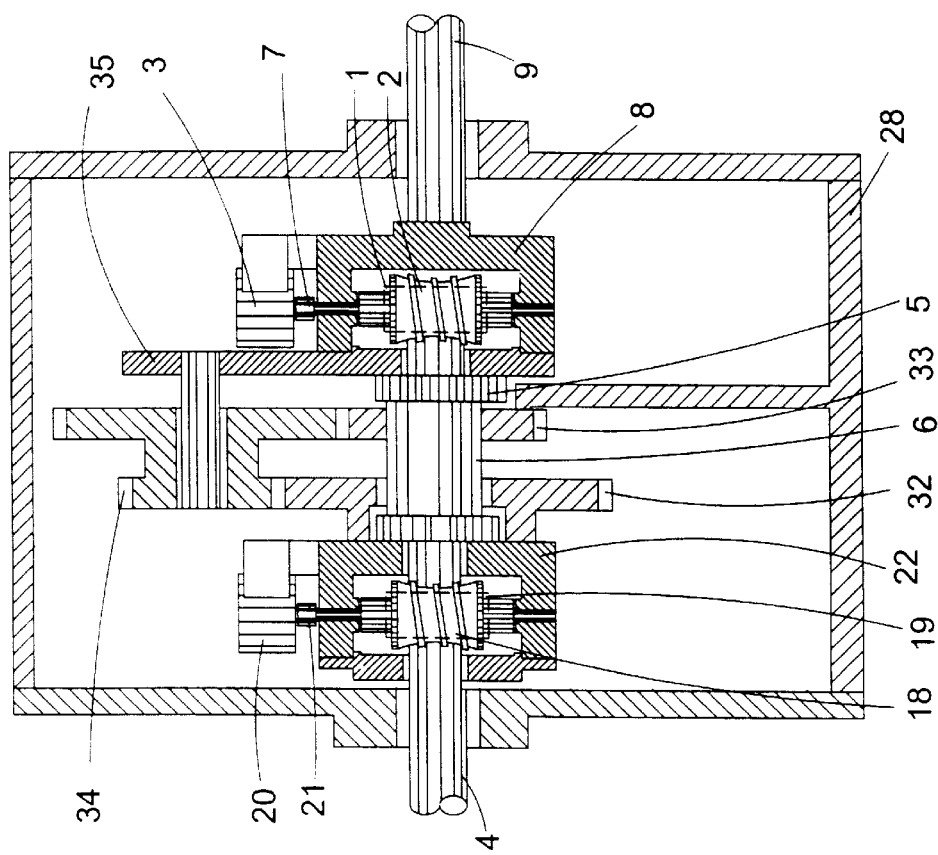
FIG. 13 shows a third embodiment transmission.
Figure 14:
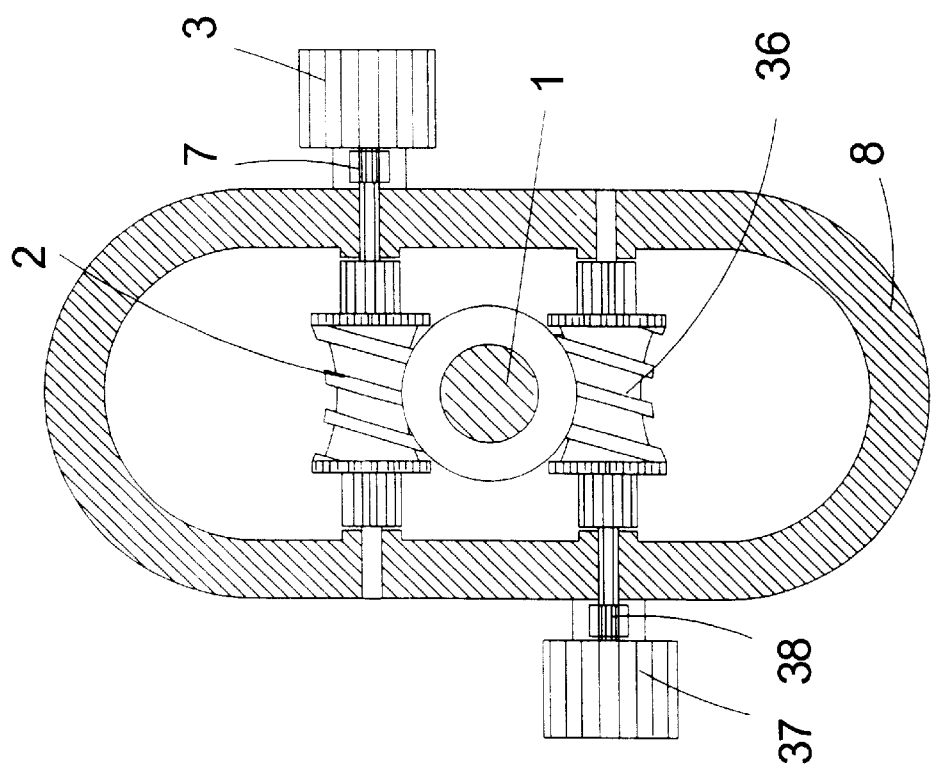
FIG. 14 shows another arrangement of the inventive system for transmitting particularly high torque loads.

The inventive systems shown in FIGS. 12–14 also allow the starting and braking of a vehicle incorporating this system as its transmission. In operating the system to start a vehicle, both auxiliary motors 3 and 20 are rotated to avoid any interaction between their respective to the input shaft 4. Rather, the input shaft 4 may build up to its operating speed without having to overcome any torque load. Once a required period of time has expired, or once a torque meter recognizes that the input shaft 4 is now capable of transmitting torque, one of the auxiliary motors 3 and 20 is stopped such that torque will then be transmitted to its respective worm 2 or 18.

In a method of braking a vehicle, the torque to the input shaft 4 is reduced upon receipt of a signal that it is desirable to brake the vehicle. At that time, the normal operation of the auxiliary motors 3 and 20 is switched. The auxiliary motor that would typically be driven to avoid any driving interaction between its worm and respective worm gear during a particular direction of rotation of the oscillating input is switched such that it does achieve such a connection. The worm that would typically be providing the driving connection in that first direction is switched such that it avoids any connection. In this way, there is no positive torque delivered to the output shaft. Instead, there is a negative torque delivered to slow the rotational speed of the output shaft 9.

FIG. 12 shows an alternative embodiment wherein the connection between the two worm and worm gear combinations is replaced by a bevel gear 29, an idler gear 30 and a gear 31 to drive output shaft 9 when worm 19 is driving rotor 22. Other than this aspect, the operation of the system proceeds as with the earlier embodiment.

As shown in FIG. 13, a planetary gear transmission can replace the transmission shown in FIGS. 11 and 12. In the planetary transmission, a cage 35 rotates with the rotor 8. A sun gear 33 is fixed. A sun gear 32 rotates about input shaft 4, and is driven to rotate with the rotor 22. Thus, when worm 18 rotates about the axis of worm gear 19, the gear 32 is also rotated. A double satellite 34 rotates about gears 32 and 33, and rotates cage 35. The operation of the system proceeds as with the above described systems, and results in a single directional output at output shaft 9.

FIG. 14 shows a further refinement of the basic worm and worm gear system for transmitting particularly high torque loads. In this system, worm gear 1 is provided with two worms 2 and 36. The worms are each provided with clutches 7 and 38, and auxiliary motors 3 and 37. The operation of the auxiliary worm 36 is identical to that of worm 2 during the entire operation of this system. Such a dual worm system is able to transmit a higher torque load than the single worm system. Two of these systems can be incorporated into a transmission such as shown in FIGS. 11–13, or may be utilized as a single set.

Figure 15:
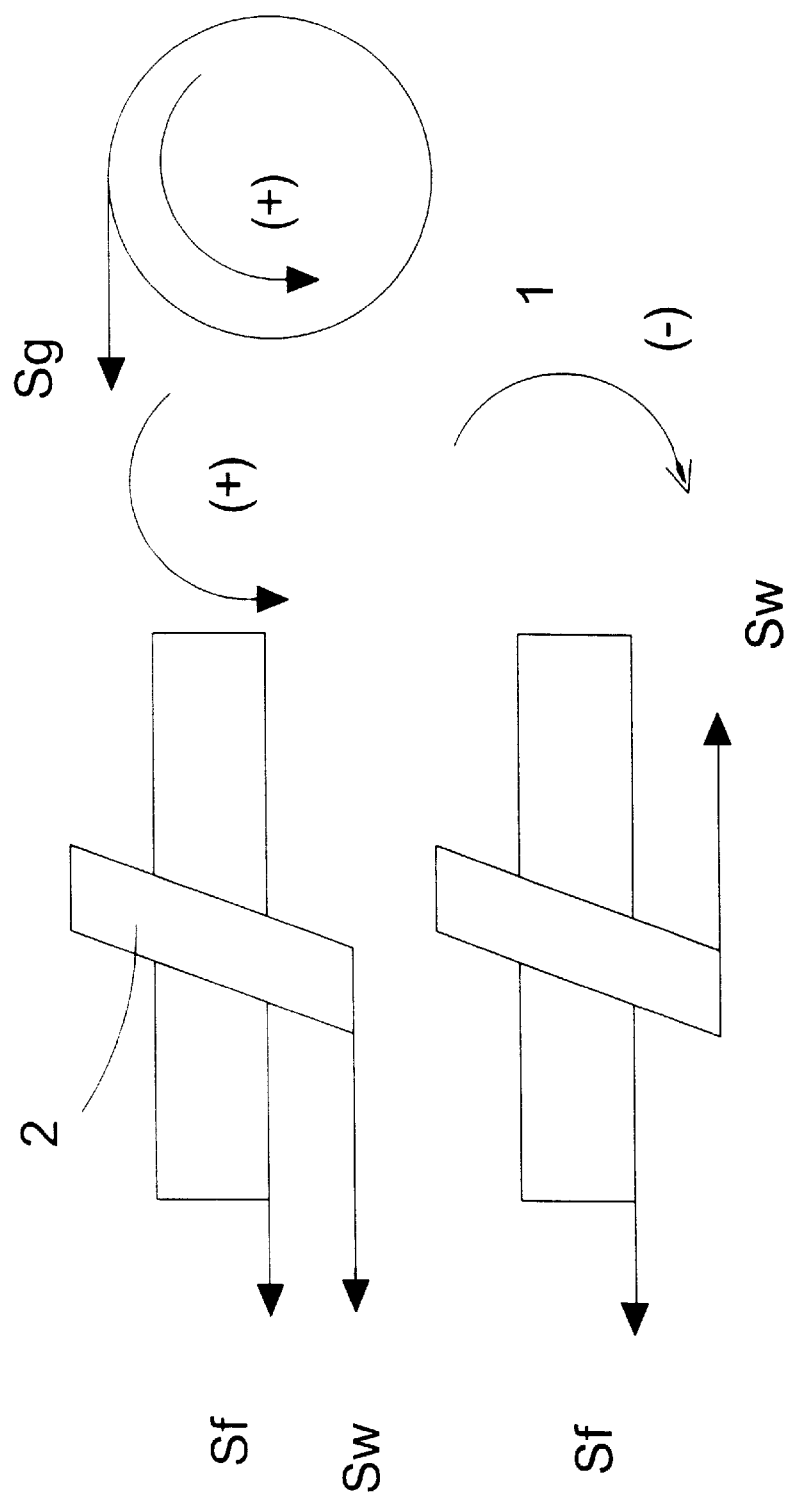
FIG. 15 schematically shows some of the functions of the inventive transmission.

The system is actually a bit simplified in its description to this point. In fact, a control for the combined systems must accurately turn the auxiliary motors at a rate such that the worm avoids interaction with the worm gear teeth. In the systems disclosed in FIGS. 11–13, both rotors will be rotating in the same direction at all times. This is due to the mechanical connection. Thus, with reference to FIGS. 11 and 13 as examples, when the worm 18 is not being utilized to actually transmit torque to the rotor 22, but rather the worm 2 is transmitting the torque to the rotor 8, the worm 18 must avoid contact with the worm gear 19. The worm 18 will be rotating at the rotational speed of the rotor 22, and in this case, the worm gear 19 will be rotating in an opposed direction. Thus, as shown schematically in FIG. 15*a*, the rotation $S_g$ from the worm wheel 1 is in an opposite direction to the rotation of the rotor $S_f$, which is, of course, applied to the worm 2. This would be the rotation during the normal operation of the system showing FIGS. 11–13, when the other combination is actually transmitting torque. During such a situation, the speed $s_w$ at which the worm is turned by the auxiliary motor 3 must be selected to insure that the threads on the worm 2 avoid the teeth on the worm gear 1. Alternatively, as shown in FIG. 15*b*, during the braking or starting of the system as described above, there will be situations when the direction of rotation of the rotor $S_f$ is in the same direction as the rotation of the worm gear $S_g$, and yet it would still be desirable to avoid interaction between the thread on the worm 2 and teeth on the worm gear 1. In that situation, the speed of the worms' rotation $S_w$ must be selected to insure no interaction when it is rotating in the same direction as the worm gear. An appropriate control could be designed by a worker of ordinary skill in this art. When the opposite sign of the oscillating input begins, the initial movement is of the worm gear away from the worm. This provides an unloading of the driving connection between the two, and assists the worm in moving freely to roll about the worm gear teeth. Moreover, even if the control does not ensure that the worm is out of engagement with the worm wheel, but is rotating in an opposed direction, the worm wheel motor will be able to overcome the low torque worm auxiliary motor, and thus, there will be no binding between the two.

Figure 16:
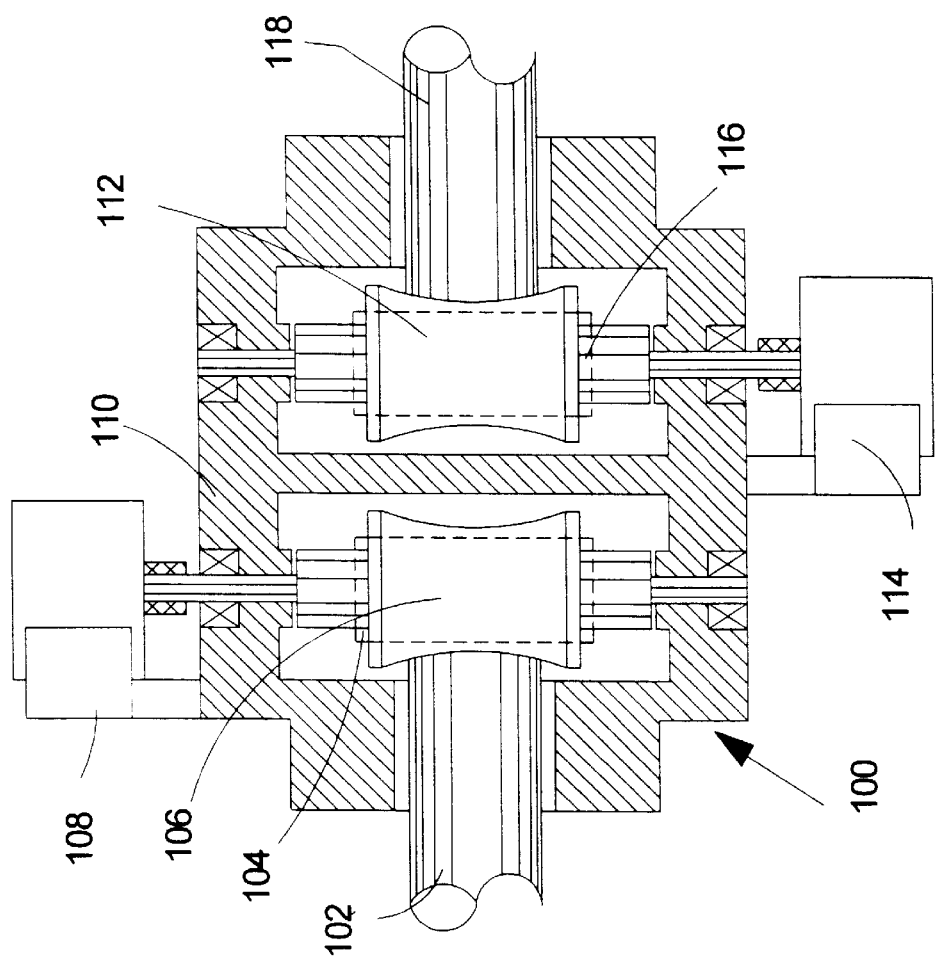
FIG. 16 shows an application of the inventive system.

FIG. 16 shows an alternative arrangement for the inventive system. An input at the shaft 102 drives the worm gear 104. The worm gear 104 engages the worm 106, provided with the motor 108 operated on the principles described above. When the worm 106 is driven to rotate by the worm gear 104 it will in turn rotate the single housing 110. When the housing 110 rotates it rotates the worm 112. The worm 112 is also provided with the motor 114, also operated generally on the principles as described above. The worm 112 drives the worm gear 116 to drive the output shaft 118. This arrangement reduces the necessary speed ratio between the input and output shafts. The input and output speed may differ under certain driving conditions. The output could begin to rotate faster than the input. The motors 108 and 114 have to accommodate that ratio. The speed ratio may be divided between the two motors 108 and 114. Example of this arrangement is differential system. Input torque from the input shaft 102 and the input shaft 118 can rotate the rotor 110 with speed depending on magnitude of torque from the shafts 102 and 118 and magnitude of a load applying to the rotor 110.

Figure 17:
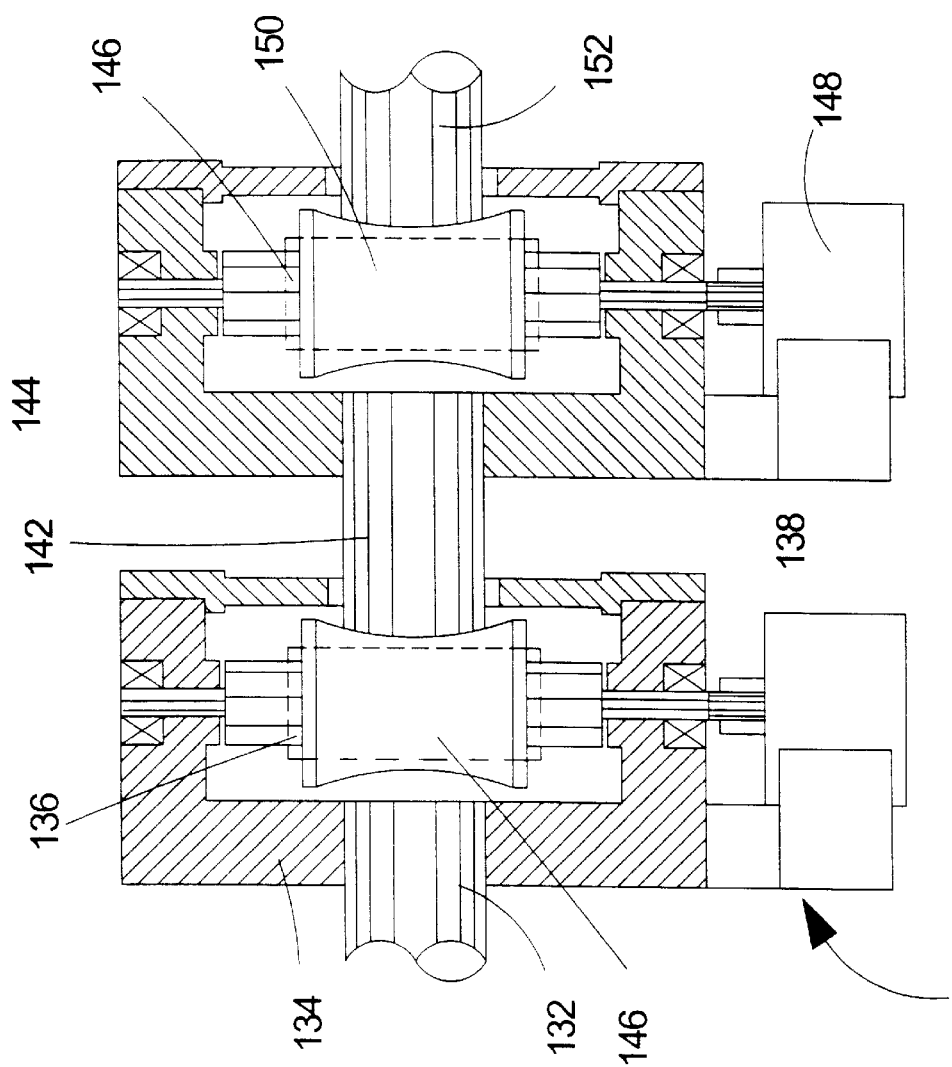
FIG. 17 shows another application of the inventive system.

FIG. 17 shows a system 130 wherein the input shaft 132 drives the housing 134. The housing 134 drives the worm 136 and its motor 138. The motor 138 is operated according to the principles described above. The worm 136 drives the worm gear 146 which drives the shaft 142. The shaft 142 rotates the housing 144. When the housing 144 rotates it rotates worm 146. The worm 146 is controlled by the motor 148, again according the principles described above. The worm 146 engages the worm gear 150 to drive the output shaft 152. This arrangement also assists the motor 138 and 148 to accommodate a speed ratio.

Figure 18:
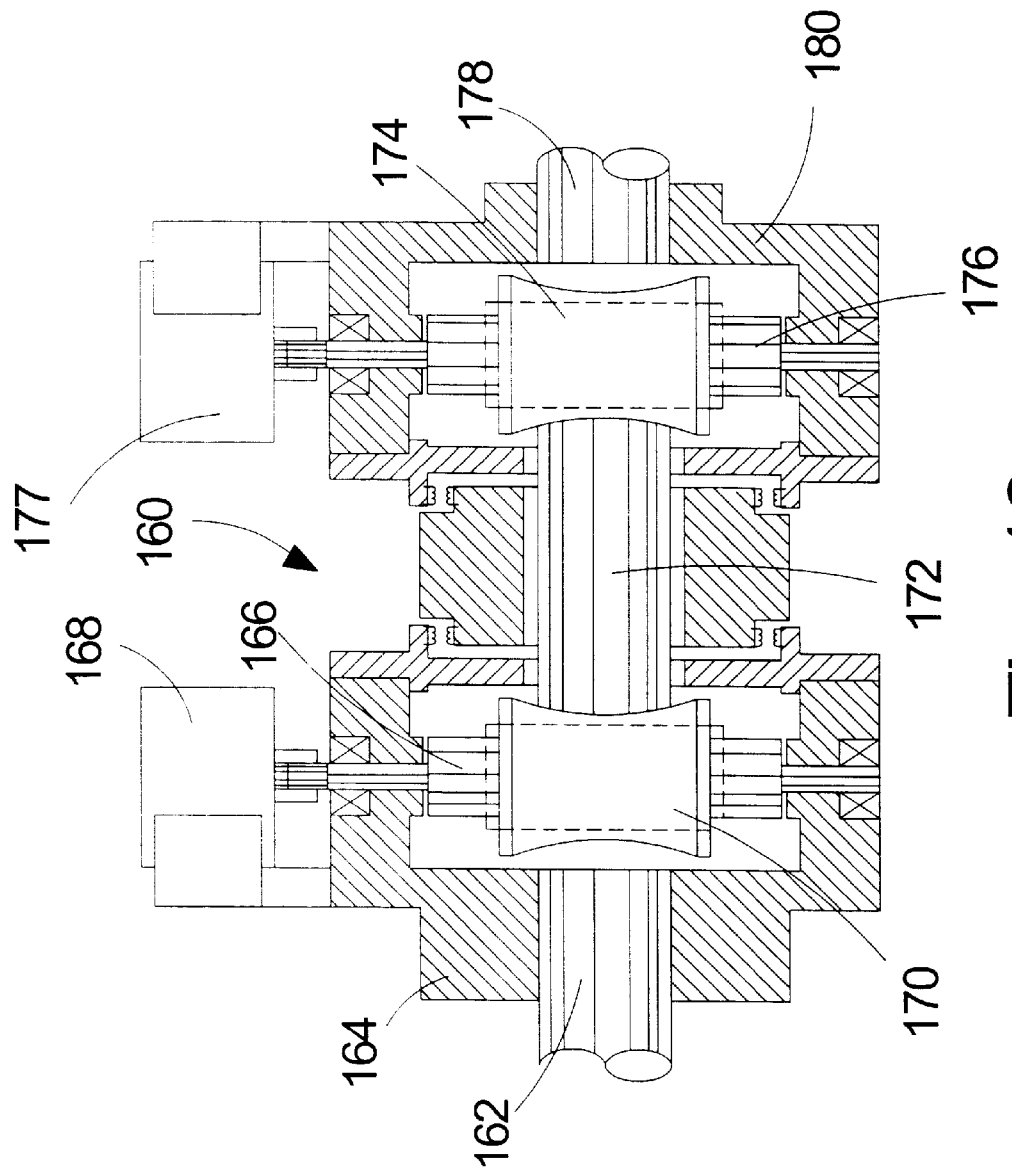
FIG. 18 shows yet another application of the inventive system.

FIG. 18 shows yet another system 160. In the system 160, the input shaft 162 rotates the housing 164. The worm 170 rotates with the housing 164. The motor 168 controls the worm 170 as with the above described systems. The worm gear 166 is driven by the worm 170, and rotates the shaft 172. The shaft 172 drives the worm gear 176, which drives worm 174 with the housing 180. A motor 177 controls the rotation of worm 174. When worm 176 is rotated it drives housing portion 180 to in turn drive output shaft 178. Again, the arrangement assists motors 168 and 177 to accommodate the speed ratio.

FIGS. 16–18 show that the basic inventive system can be reconfigured into many different mechanical transmissions. For example, FIG. 16 can be used in a differential drive real axle of a car. Those that are illustrated are by no means exhaustive of all of the possible combinations.

Figure 19:
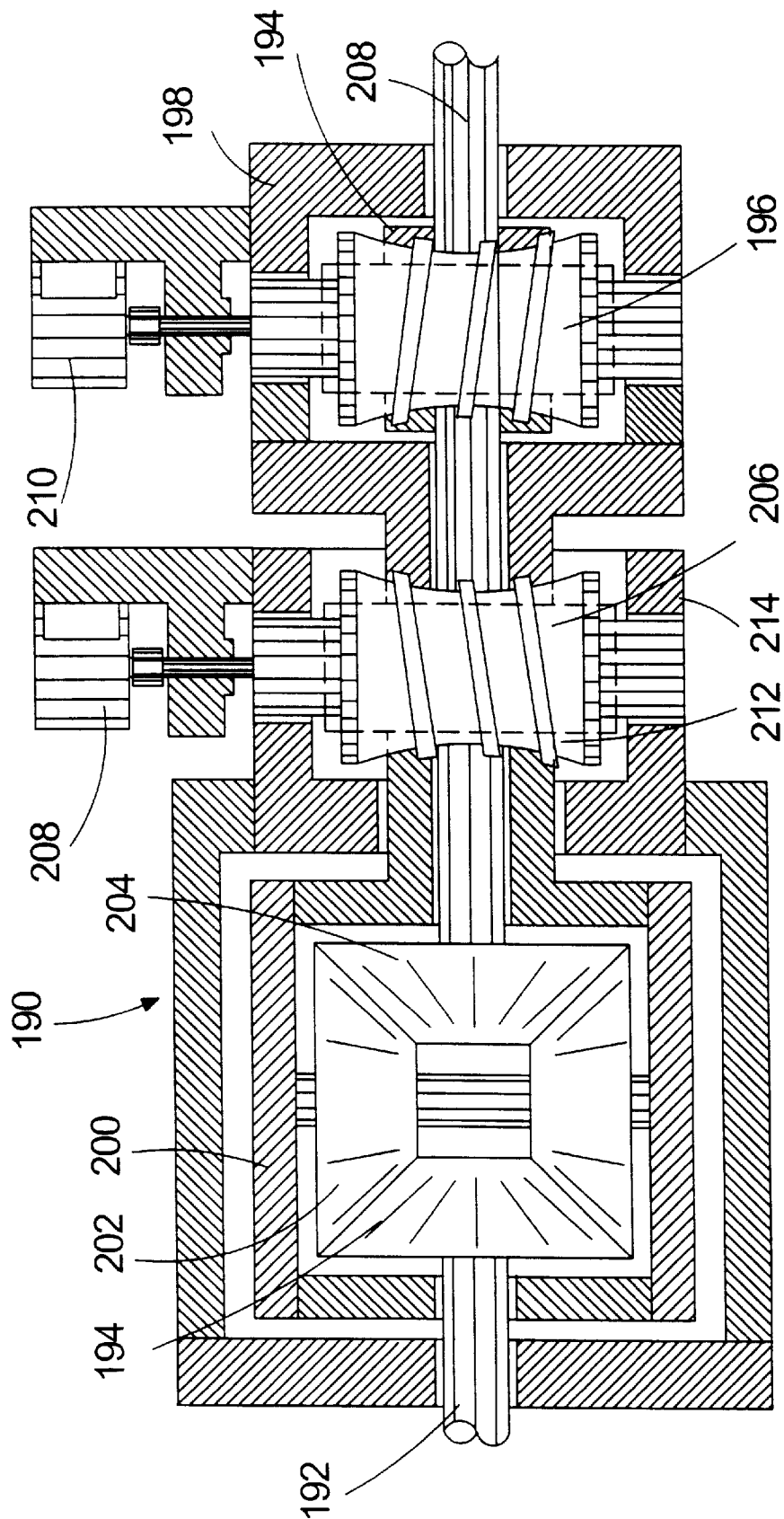
FIG. 19 shows a fourth embodiment transmission.

FIG. 19 shows a system 190. In the system 190, the input shaft 192 rotates the bevel gear 194. When said input shaft 192 has a first direction of rotation, it rotates worm gear 194. At the same time, there is no relative movement between the worm gear 194, the worm 196, and the shaft 192. The rotor 198 rotates the housing 200 and the bevel gears 194, 202, 204 as a single whole body. The worm 206 is controlled by the motor 208 according to the principles described above. When said input shaft 192 is rotating in an opposed direction, the worm 206 prevents the worm gear 212 and the housing 200 which is connected to the worm gear 212 from rotation. The bevel gear 204 has the first direction to the rotation, but it rotates in the opposite direction to the rotation of input shaft 192. It rotates the output shaft 208 only in the first direction. The worm 196 is controlled by the motor 210 according the principles described above. First and main advantage of the embodiment shown in FIG. 19 is that worm 206 does not rotate about the axis of rotation of the worm gear 212. The rotor 214 is fixed and does need balancing. Second advantage is there is no problem of an electrical power supply to the auxiliary motor 208.

Figure 20:
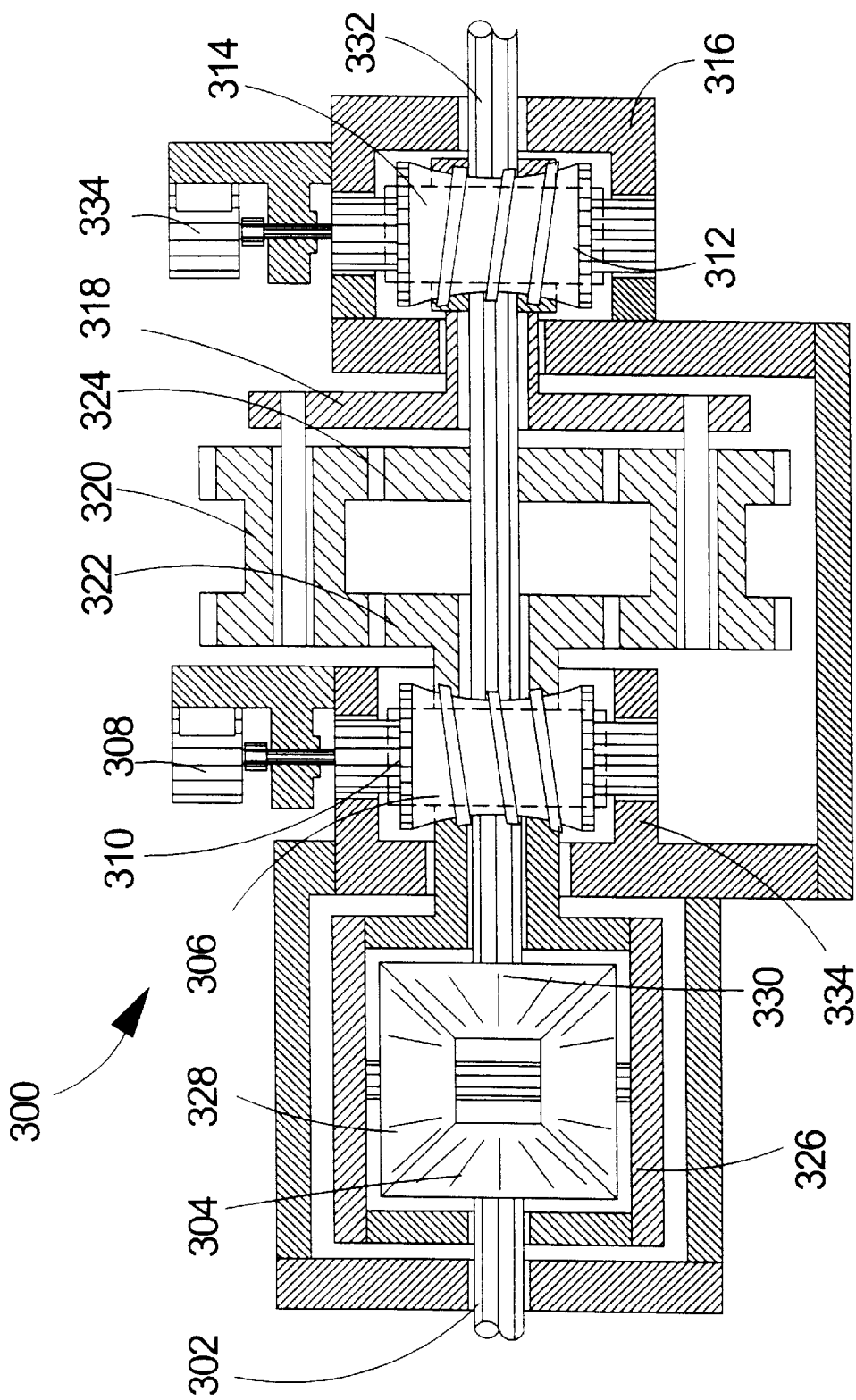
FIG. 20 shows a fifth embodiment transmission.

FIG. 20 shows a system 300 wherein the input shaft 302 rotates the bevel gear 304. When said input shaft 302 has the first direction of rotation, the worm 306 is controlled by the motor 308 according the principles described above, and the worm gear 310 has free motion. A self-lock between the worm gear 312 and the worm 314 (which is inside fixed rotor 316) prevents housing 318 from rotating. The spider gear 320 also has a fixed axis of rotation. The first sun gear 322 of said spider differential and the second sun gear 324 of said spider differential have the same speed of rotation. The input shaft 302, the housing 326 of said bevel differential with the bevel gear 304, 328, 330, and the output shaft 332 have the same speed of the rotation in first direction. There is not any relative motion between them. The efficiency of transfer of mechanical energy is very high.

When said input shaft 302 has an opposite direction of the rotation, there is a self-lock between the worm 304 and the worm gear 310. The worm gear 310 prevents the housing 326 from rotating, and therefore the bevel gear 330 has an opposite direction of rotation to rotation of the input shaft 302. The worm 314 is controlled by the motor 334 according to the principles described above, and at the same time, the worm gear 312 and the horsing 318 have free motion. The spider gear 320 has an unfixed axle of rotation, and it is able to rotate free. The output shaft 332 has the first direction of rotation. The rotors 16 and 334 are fixed and do not need balancing; there is no a problem to supply electrical power to the auxiliary motors 208 and 210.

The new one way clutch described above has some advantages: it provides the fast reverse of a movement of output shaft by changing direction of rotation of an auxiliary motor; it requires little or no lubrication between working parts because between a worm and a worm gear have relative motion only when the worm is unloaded, it provides elimination of backlash between the worm gear and the worm.

Several embodiments of the present invention have been disclosed. A worker of ordinary skill in the art would recognize that certain modifications would come within the scope of this invention.

I claim:

1. A worm/worm gear transmission comprising:

an enveloping type worm gear;

an enveloping worm having at least one screw thread that is engaged by at least one tooth of said worm gear;

said enveloping worm having an enveloping angle greater than 15 degrees for one revolution of said screw thread, wherein said worm gear has a number of gear teeth less than 24.

2. A worm/worm gear transmission as recited in claim 1, wherein the number of gear teeth is less than or equal to 12.

3. A worm/worm gear transmission is recited in claim 1, wherein said enveloping angle of said worm is greater than 15 degrees.

4. A worm/worm gear transmission is recited in claim 1, wherein said enveloping angle of said worm is greater than 30 degrees.

5. A worm/worm gear clutch comprising:

a worm gear with enveloping type teeth;

an enveloping worm having at least one screw thread that is engaged by at least one tooth of said worm gear;

wherein the transmission is self-locking and said worm being mounted in a rotor such that said rotor and said worm may rotate about an axis of rotation of said worm gear;

said worm has an auxiliary motor for rotating said worm about its axis of rotation relative to said worm gear.

* * * * *